United States Patent
Wang et al.

(10) Patent No.: US 12,256,781 B2
(45) Date of Patent: Mar. 25, 2025

(54) HEAT-GENERATING ELECTRONIC PASTE COMPOSITION, HEAT-GENERATING ELECTRONIC PASTE AND METHOD FOR PREPARING THE SAME, HEAT-GENERATING BODY OF ELECTRONIC CIGARETTE AND ELECTRONIC CIGARETTE

(71) Applicant: SHENZHEN SMOORE TECHNOLOGY LIMITED, Shenzhen (CN)

(72) Inventors: Hongjun Wang, Shenzhen (CN); Changyong Yi, Shenzhen (CN); Xuebo Xue, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 281 days.

(21) Appl. No.: 17/615,935

(22) PCT Filed: Jun. 2, 2020

(86) PCT No.: PCT/CN2020/093947
§ 371 (c)(1),
(2) Date: Dec. 2, 2021

(87) PCT Pub. No.: WO2020/253519
PCT Pub. Date: Dec. 24, 2020

(65) Prior Publication Data
US 2023/0404151 A1    Dec. 21, 2023

(30) Foreign Application Priority Data
Jun. 20, 2019  (CN) .................. 201910536602.1

(51) Int. Cl.
A24F 40/70    (2020.01)
A24F 40/46    (2020.01)
(Continued)

(52) U.S. Cl.
CPC .............. *A24F 40/46* (2020.01); *A24F 40/70* (2020.01); *C09D 5/24* (2013.01); *C09D 7/20* (2018.01);
(Continued)

(58) Field of Classification Search
None
See application file for complete search history.

(56) References Cited

FOREIGN PATENT DOCUMENTS

| CN | 101892008 A | 11/2010 |
| CN | 102034877 A | 4/2011 |

(Continued)

OTHER PUBLICATIONS

Fourth Office Action for Chinese Patent Application No. 201910536602.1 mailed Dec. 15, 2022.
(Continued)

*Primary Examiner* — Tho D Ta
(74) *Attorney, Agent, or Firm* — Dorsey & Whitney LLP

(57) ABSTRACT

The disclosure relates to a heat-generating electronic paste composition, a heat-generating electronic paste and a method for preparing the same, a heat-generating body of an electronic cigarette, and an electronic cigarette. The heat-generating electronic paste composition includes a water-based carrier and a functional phase. The water-based carrier includes a water-soluble binder and water, and the functional phase includes an electrically conductive material.

19 Claims, 2 Drawing Sheets

--- mixing a water-soluble binder with water, and performing a first heat treatment to obtain a water-based carrier — S101 mixing the water-based carrier with a functional phase, and performing a second heat treatment to obtain a heat-generating electronic paste — S102

(51) Int. Cl.
  *C09D 5/24* (2006.01)
  *C09D 7/20* (2018.01)
  *C09D 7/63* (2018.01)
  *C09D 7/65* (2018.01)
  *C09D 7/80* (2018.01)
  *C09D 101/02* (2006.01)
  *H01B 1/02* (2006.01)
  *H05B 3/20* (2006.01)

(52) U.S. Cl.
  CPC ............... *C09D 7/63* (2018.01); *C09D 7/65* (2018.01); *C09D 7/80* (2018.01); *C09D 101/02* (2013.01); *H01B 1/02* (2013.01); *H05B 3/20* (2013.01); *H05B 2203/013* (2013.01); *H05B 2203/017* (2013.01)

(56) References Cited

FOREIGN PATENT DOCUMENTS

| | | |
|---|---|---|
| CN | 102993614 A | 3/2013 |
| CN | 105326092 A | 2/2016 |
| CN | 105472791 A | 4/2016 |
| CN | 106304435 A | 1/2017 |
| CN | 108912989 A | 11/2018 |
| CN | 109698040 A | 4/2019 |
| CN | 109875125 A | 6/2019 |
| CN | 110419763 A | 11/2019 |
| JP | H10326521 A | 12/1998 |
| JP | 2016033962 A | 3/2016 |
| WO | WO-2016173726 A1 * 11/2016 ............... B60N 2/56 |

OTHER PUBLICATIONS

Zhao, "Modern Welding and Joining Technology", Metallurgical Industry Press, Jun. 2016, pp. 160-161.
Written Opinion from International Application No. PCT/CN2020/093947 mailed Sep. 8, 2020.
Office Action dated Apr. 1, 2021 for Chinese Application No. 201910536602.1.
Office Action dated Sep. 30, 2021 for Chinese Application No. 201910536602.1.
Office Action for Chinese Application No. 201910536602.1 mailed Dec. 23, 2021.
Office Action for Chinese Application No. 201910536602.1 mailed Aug. 2, 2022.
Office Action for European Application No. 20826706.2 mailed Nov. 7, 2022.
International Search Report from International Application No. PCT/CN2020/093947 mailed Sep. 8, 2020.

* cited by examiner

HEAT-GENERATING ELECTRONIC PASTE COMPOSITION, HEAT-GENERATING ELECTRONIC PASTE AND METHOD FOR PREPARING THE SAME, HEAT-GENERATING BODY OF ELECTRONIC CIGARETTE AND ELECTRONIC CIGARETTE

TECHNICAL FIELD

The present disclosure relates to the technical field of electronic materials, and in particular relates to a heat-generating electronic paste composition, a heat-generating electronic paste and a method for preparing the same, a heat-generating body of an electronic cigarette, and an electronic cigarette.

BACKGROUND

Electronic paste is a composite material that integrates the characteristics of multiple materials, and is a basic material for manufacturing thick-film components. According to use and sintering temperature, electronic paste can be divided into many types, such as conductive pastes, resistor pastes, high-temperature, medium-temperature, and low-temperature sintering pastes, etc. With the rapid development of the electronic information industry, the demand for electronic pastes is increasing. Among them, the heat-generating electronic paste has wide applications, and can be used in thick-film resistors, resistor networks, hybrid integrated circuits, electronic cigarettes, fast-heating electric kettles, windshields, showcases, special-purpose resistors, electrodes, etc.

In preparation of existing heat-generating electronic paste, terpineol is mostly used as an organic solvent to swell cellulose to obtain a suspension, which is then mixed with functional powder. The heat-generating electronic paste is screen printed on the substrate, cured, and then sintered to eventually form a heat-generating circuit on the substrate. However, during the screen printing and curing, the volatilization of organic solvent produces an irritating odor, which not only pollutes the environment, but also threatens the health of the operator. In order to remove the odor, strong ventilation is usually performed, which not only increases the cost of cleaning, but still cannot completely eradicate the irritating odor.

SUMMARY

In view of this, there is a need to provide a heat-generating electronic paste composition with environmental friendliness and a reduced cost.

In addition, a heat-generating electronic paste and a method for preparing the same, a heat-generating body of an electronic cigarette, and an electronic cigarette are also provided.

A heat-generating electronic paste composition includes a water-based carrier and a functional phase. The water-based carrier includes a water-soluble binder and water, and the functional phase includes an electrically conductive material.

A method for preparing a heat-generating electronic paste includes following steps:

mixing a water-soluble binder with water, and performing a first heat treatment to obtain a water-based carrier;

mixing the water-based carrier with a functional phase, and performing a second heat treatment to obtain the heat-generating electronic paste; wherein the functional phase includes an electrically conductive material.

A heat-generating electronic paste is prepared by the above-described method.

A heat-generating body of an electronic cigarette includes a substrate and a heat-generating circuit formed on the substrate. The heat-generating circuit is made from the above-described heat-generating electronic paste.

An electronic cigarette includes the above-described heat-generating body of the electronic cigarette.

The details of one or more embodiments of the present application are presented in the following drawings and description, and other features, purposes and advantages of the present application will become apparent from the description, drawings and claims.

Figure 1:
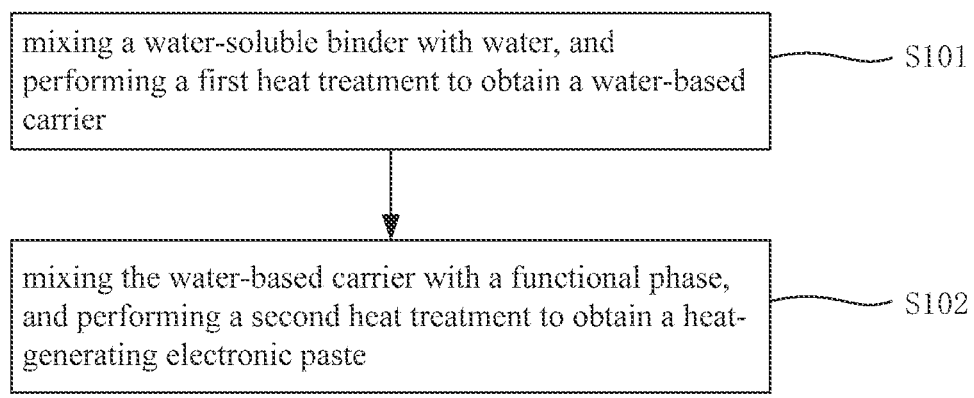
FIG. 1 is a flow chart of preparation of an embodiment of a heat-generating electronic paste composition.

In order to better describe and illustrate the embodiments and/or examples of the disclosures disclosed herein, one or more drawings may be referred to. The additional details or examples used to describe the drawings should not be considered as limiting the scope of any of the disclosed disclosures, the currently described embodiments and/or examples, and the best mode of these disclosures currently understood.

DETAILED DESCRIPTION

In order to facilitate the understanding of the present disclosure, the present disclosure will be comprehensively described with reference to the drawings. The embodiments of the present disclosure are shown in the drawings. However, the present disclosure can be implemented in many different forms and therefore is not limited to the embodiments described herein. On the contrary, the purpose of providing these embodiments is to make the understanding of the disclosure of the present disclosure more thorough and comprehensive.

Unless otherwise defined, all technical and scientific terms used herein have the same meaning with those commonly accepted by a person skilled in the art of the present disclosure. The terms used in the description of the present disclosure herein are only for the purpose of describing specific embodiments, and are not intended to limit the present disclosure. The term "and/or" as used herein refers to any and all combinations of one or more related listed items.

According to an embodiment of a heat-generating electronic paste composition, the composition includes a water-based carrier and a functional phase, the water-based carrier includes a water-soluble binder and water, and the functional phase includes an electrically conductive material.

In an embodiment, a weight ratio of the water-based carrier to the functional phase is 1:(2-5). This range is beneficial to promote compatibility between the water-based carrier and the functional phase and to improve a heat-generating effect.

In an embodiment, a weight ratio of the water-soluble binder to the water is (15-30):100. This range can make the water-based carrier have suitable viscosity and water retention, which is not only beneficial to dispersing the functional phase, but also satisfies the requirements in processing a heat-generating circuit and improves the heat-generating effect.

In an embodiment, the water-soluble binder is selected from at least one of a modified starch, methylcellulose, hydroxymethylcellulose, and carboxymethylcellulose.

In an embodiment, the water-soluble binder includes the modified starch and the methylcellulose. The combination of the modified starch and the methylcellulose is adopted as the water-based binder, which can further optimize the microstructure of the water-based carrier and achieve the effect of synchronizing the suspension and water retention of the water-based carrier. Further, a weight ratio of the modified starch to the methylcellulose is 1:(1-3).

Specifically, the modified starch refers to a substance obtained by modifying starch molecules by physical, chemical or enzymatic treatment. By introducing a new functional group on the starch molecules or changing the size of starch molecules and the properties of starch granules, the properties of starch can be changed. Further, a weight-average molecular weight of the modified starch can be 10,000 to 80,000. Specifically, the modified starch includes at least one of a pregelatinized starch, a cross-linked starch, and an etherified starch.

Specifically, the structural formula of the methylcellulose is:

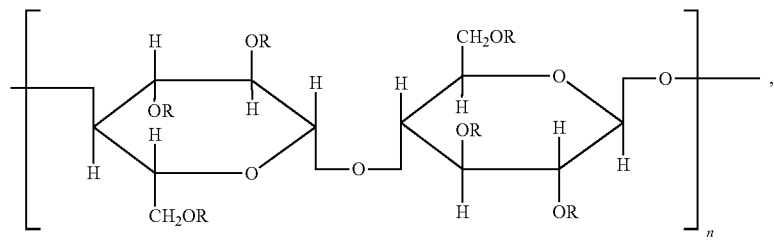

wherein R is —H or —CH$_3$. Further, a weight-average molecular weight of the methylcellulose can be 20,000 to 100,000.

The electrically conductive material is a substance that is electrical conductive, which can be various metal materials, as long as it does not chemically react with water at room temperature.

In an embodiment, the electrically conductive material is at least one of stainless steel, nickel-chromium alloy, and iron-chromium-aluminum alloy.

In an embodiment, the electrically conductive material is in powder form.

In an embodiment, the functional phase further includes a surface modifier for surface modification of the electrically conductive material, thereby further improving the compatibility between the functional phase and the water-based carrier.

In an embodiment, the surface modifier includes at least one of microcrystalline cellulose, hydroxymethylcellulose, and carboxymethylcellulose. The above-mentioned surface modifiers can promote sufficient mixing between the electrically conductive material and the water-based carrier.

In an embodiment, a weight ratio of the surface modifier to the electrically conductive material is (3-8):100.

In an embodiment, the heat-generating electronic paste composition further includes a functional additive for improving the functionality of the heat-generating electronic paste, optimizing product performance, and prolonging a service life of a product.

In an embodiment, the functional additive includes at least one of a thixotropic agent and a preservative.

Specifically, the thixotropic agent is a functional additive for improving thixotropy of the water-based carrier. In an embodiment, the thixotropic agent is selected from at least one of hydrogenated castor oil, oleic acid, and stearic acid. Further, based on 100 parts by weight of the water-based carrier, the content of the thixotropic agent is 0.3 to 1 part by weight.

Specifically, the preservative is a functional additive used to prevent mildew and spoilage of the water-based carrier. In an embodiment, the preservative is selected from at least one of sodium benzoate, sorbate, dehydroacetate, and ammonium nitrate. Further, based on 100 parts by weight of the water-based carrier, the content of the preservative is 0.2 to 0.8 parts by weight.

Referring to FIG. 1, a method for preparing a heat-generating electronic paste includes following steps:

S101: a water-soluble binder is mixed with water, and a first heat treatment is performed to obtain a water-based carrier.

In an embodiment, the conditions of the first heat treatment are as follows: the temperature is 80° C. to 90° C.; the time is 4 hours (h) to 6 h.

In an embodiment, the first heat treatment is performed in a water bath. Further, the first heat treatment is performed under stirring, and the rotation speed of the stirring can be 200 rpm to 400 rpm.

In an embodiment, before mixing the water-based carrier with the functional phase, the electrically conductive material is mixed with the surface modifier to obtain the functional phase. That is, the electrically conductive material is firstly mixed with the surface modifier to obtain the functional phase, and then the water-based carrier is mixed with the functional phase. During the mixing between the electrically conductive material and the surface modifier, the surface modifier modifies the electrically conductive material, so that the surface modified electrically conductive material has better compatibility when mixing with the water-based carrier. In order to promote the surface modification, the mixing between the functional phase and the surface modifier can be carried out under stirring. The rotation speed of the stirring can be 200 rpm to 400 rpm, and the stirring time can be 4 h to 6 h.

S102: the water-based carrier is mixed with the functional phase, and a second heat treatment is performed to obtain the heat-generating electronic paste.

In an embodiment, the water-based carrier is firstly mixed with the functional phase, then mixed with the functional additive, and then subjected to the second heat treatment.

In an embodiment, the conditions of the second heat treatment are as follows: the temperature is 80° C. to 90° C.; the time is 6 h to 8 h.

In an embodiment, the second heat treatment is performed in a water bath. Further, the second heat treatment is performed under stirring, and the rotation speed of the stirring can be 200 rpm to 400 rpm.

In the above-described method, the type and amount of the water-soluble binder, the functional phase, the surface modifier, the functional additive and other raw materials are referred to the above description, and will not be repeated here.

Through the above-described method, the water-soluble binder is mixed with water under suitable heat treatment conditions to prepare the water-based carrier, and then the resulting water-based carrier is mixed and reacted with the functional phase and, optionally, the functional additive to finally prepare the heat-generating electronic paste.

The heat-generating electronic paste prepared by the above-described method does not contain organic solvents, and will not generate irritating odors during the subsequent processing into a heat-generating circuit, which reduces environmental pollution and avoids affecting the health of the operator.

A heat-generating body of an electronic cigarette includes a substrate and a heat-generating circuit formed on the substrate. The heat-generating circuit is made from the above-described heat-generating electronic paste.

Figure 2:
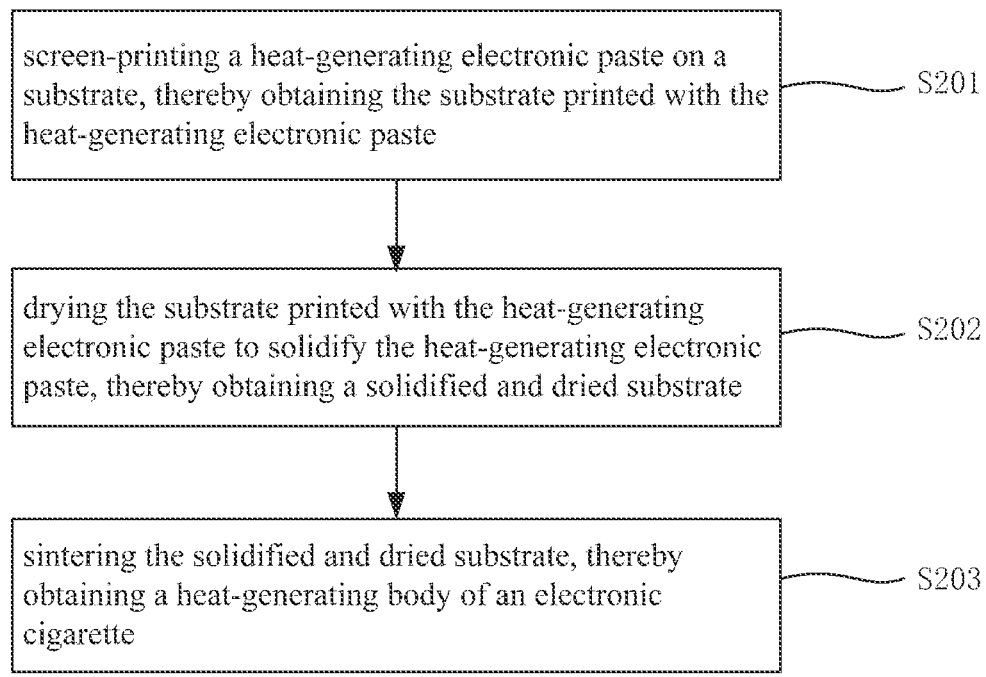
FIG. 2 is a flow chart of preparation of an embodiment of a heat-generating body of an electronic cigarette.

Referring to FIG. 2, a method for preparing a heat-generating body of an electronic cigarette includes following steps:

S201: the heat-generating electronic paste is screen-printed on the substrate, thereby obtaining the substrate printed with the heat-generating electronic paste.

In an embodiment, the substrate is a porous ceramic substrate or a composite alumina ceramic substrate.

In an embodiment, the condition of the screen-printing is as follows: the printing pressure is 0.1 MPa to 0.6 MPa.

S202: the substrate printed with the heat-generating electronic paste is dried to solidify the heat-generating electronic paste, thereby obtaining a solidified and dried substrate.

In an embodiment, the conditions of the drying are as follows: the temperature is 80° C. to 100° C.; the time is 30 min to 45 min.

In an embodiment, the drying is performed in an electric solidifying oven.

S203: the solidified and dried substrate is sintered, thereby obtaining the heat-generating body of the electronic cigarette.

In an embodiment, the sintering conditions are as follows: the temperature is 800° C. to 1200° C.; the time is 60 min to 120 min.

In an embodiment, the sintering is performed in a sintering furnace. When the sintering is completed, the solidified heat-generating electronic paste forms the heat-generating circuit on the substrate.

In the above-described process of preparing the heat-generating body of the electronic cigarette, especially in the solidifying and sintering process, because the heat-generating electronic paste does not contain organic solvents, no irritating odor is generated, which improves comfort of work of the operator, avoids affecting the health of the operator, and eliminates additional cleaning procedures, thereby significantly reducing the production cost and having energy conservation and emission reduction.

An electronic cigarette includes the above-described heat-generating body of the electronic cigarette.

The present disclosure is further illustrated by the following specific examples, which are not used to limit the present disclosure.

In the examples, the modified starch is the pregelatinized starch, purchased from Shanghai Yuanju Bio-Technology, the product number is Y0365, and the weight average molecular weight is 50,000. Methylcellulose was purchased from Guidechem, CAS number: 9004-67-5, and a weight average molecular weight is 30,000. The stainless steel powder was purchased from Aladdin, the product number is S118293. Microcrystalline cellulose was purchased from Yuanye Biology, the product number is S25132. Hydrogenated castor oil was purchased from Thankful (Guangzhou) Advanced Materials, CAS number: 8001-78-3. Sodium benzoate was purchased from Aike Reagent, CAS number: 532-32-1.

Examples 1 to 6 are used to illustrate the heat-generating electronic paste and its preparation method.

Example 1

(1) The modified starch and methylcellulose with a weight ratio of 1:2 are added to 85° C. water. The ratio of the total weight of the modified starch and methylcellulose to the weight of water is 20:100. The first heat treatment is carried out for 5 hours under the conditions of 85° C. water bath and stirring (the rotation speed of the stirring is 250 rpm), and the water-based carrier is obtained after passing through a 200-mesh sieve.

(2) The stainless steel powder is passed through a 200-mesh sieve, and mixed with microcrystalline cellulose in a weight ratio of 100:6 by stirring at room temperature (the rotation speed of the stirring is 250 rpm) for 5 hours to obtain the functional phase.

(3) The water-based carrier and the functional phase with a weight ratio of 1:4 are mixed together, added with hydrogenated castor oil and sodium benzoate. The amount of hydrogenated castor oil is 0.5 parts by weight, and the amount of sodium benzoate is 0.5 parts by weight, for every 100 parts by weight of the water-based carrier. Then the second heat treatment is carried out for 7 hours under the conditions of 85° C. water bath and stirring (the rotation speed of the stirring is 250 rpm), and the heat-generating electronic paste is obtained after passing through a 200-mesh sieve.

Example 2

The preparation process of the heat-generating electronic paste in this example is substantially the same as that in Example 1, except that in step (1) of this example, only methylcellulose is used as the water-soluble binder. Specifically, step (1) is as follows: Methylcellulose is added to 85° C. water. The weight ratio of methylcellulose to water is 20:100. The first heat treatment is carried out for 5 hours under the conditions of 85° C. water bath and stirring (the rotation speed of the stirring is 250 rpm), and then the water-based carrier is obtained after passing through a 200-mesh sieve.

Example 3

The preparation process of the heat-generating electronic paste in this example is substantially the same as that in Example 1, except that in step (1) of this example, only modified starch is used as the water-soluble binder. Specifically, step (1) is as follows: The modified starch is added to 85° C. water. The weight ratio of the modified starch to water is 20:100. The first heat treatment is carried out for 5 hours under the conditions of 85° C. water bath and stirring (the rotation speed of the stirring is 250 rpm), and then the water-based carrier is obtained after passing through a 200-mesh sieve.

Example 4

The preparation process of the heat-generating electronic paste in this example is substantially the same as that in Example 1, except that in step (2) of this example, the surface modifier, i.e., the microcrystalline cellulose, is not used. Specifically, step (2) is as follows: The stainless steel powder is passed through a 200-mesh sieve to obtain the functional phase.

Example 5

The preparation process of the heat-generating electronic paste in this example is substantially the same as that in Example 1, except that in step (3) of this example, no functional additive is added. Specifically, step (3) is as follows: The water-based carrier and the functional phase with a weight ratio of 1:4 are mixed together, and then subjected to the second heat treatment for 7 hours under the conditions of 85° C. water bath and stirring (the rotation speed of the stirring is 250 rpm). The heat-generating electronic paste is obtained after passing through a 200-mesh sieve.

Example 6

(1) The modified starch and methylcellulose with a weight ratio of 1:4 are added to 85° C. water. The ratio of the total weight of the modified starch and methylcellulose to the weight of water is 10:100. The first heat treatment is carried out for 5 hours under the conditions of 85° C. water bath and stirring (the rotation speed of the stirring is 250 rpm), and the water-based carrier is obtained after passing through a 200-mesh sieve.

(2) The stainless steel powder is passed through a 200-mesh sieve, and mixed with microcrystalline cellulose in a weight ratio of 100:10 by stirring at room temperature (the rotation speed of the stirring is 250 rpm) for 5 hours to obtain a functional phase.

(3) The water-based carrier and the functional phase with a weight ratio of 1:1 are mixed together, added with hydrogenated castor oil and sodium benzoate. The amount of hydrogenated castor oil is 0.5 parts by weight, and the amount of sodium benzoate is 0.5 parts by weight, for every 100 parts by weight of the water-based carrier. Then the second heat treatment is carried out for 7 hours under the conditions of 85° C. water bath and stirring (the rotation speed of the stirring is 250 rpm), and the heat-generating electronic paste is obtained after passing through a 200-mesh sieve.

Comparative Example 1

The heat-generating electronic paste of this comparative example uses an organic solvent, and the specific preparation process is as follows:

(1) Ethyl cellulose and terpineol with a weight ratio of 1:25 are mixed together, subjected to a heat treatment for 12 hours under the conditions of 90° C. water bath and stirring (the rotation speed of the stirring is 250 rpm), and passed through a 200-mesh sieve to obtain an organic carrier.

(2) The stainless steel powder is passed through a 200-mesh sieve to obtain a functional phase.

(3) The organic carrier and the functional phase with a weight ratio of 1:4 are mixed together, subjected to a heat treatment for 7 hours under the conditions of 85° C. water bath and stirring (the rotation speed of the stirring is 250 rpm), and passed through a 200-mesh sieve to obtain a heat-generating electronic paste.

Examples 7-12 are used to illustrate the preparation process of a heat-generating body of an electronic cigarette, using the heat-generating electronic paste of Examples 1-6.

Example 7

The heat-generating electronic paste of Example 1 is used, screen-printed on a porous ceramic substrate at a temperature of 23-27° C., a humidity of 40-60, and a printing pressure of MPa, and then sent to an electric solidifying oven and dried at 90° C. for 40 min to solidify the heat-generating electronic paste, and finally sent to the sintering furnace, and sintered at 1000-1020° C. for 1 hour. The solidified heat-generating electronic paste forms a heat-generating circuit on the porous ceramic substrate, thereby obtaining the heat-generating body of the electronic cigarette.

No irritating odor is generated during the preparation process, which improves comfort of work of operators and avoids affecting the health of the operators. Moreover, additional cleaning procedures are omitted, the production cost is reduced, and energy conservation and emission reduction are achieved.

Examples 8 to 12

The heat-generating body of the electronic cigarette is prepared using substantially the same method as in Example 7, except that the heat-generating electronic pastes of Examples 2 to 6 are respectively used to replace the heat-generating electronic paste of Example 1.

No irritating odor is generated during the preparation process, which improves comfort of work of operators and avoids affecting the health of the operators. Moreover, additional cleaning procedures are omitted, the production cost is reduced, and energy conservation and emission reduction are achieved.

Comparative Example 2

The heat-generating body of the electronic cigarette is prepared using substantially the same method as in Example 7, except that the heat-generating electronic paste of Comparative Example 1 is used to replace the heat-generating electronic paste of Example 1.

During the preparation process, due to the volatilization of the organic solvent, a severe irritating odor is generated, which threatens the health of the operators. After strong ventilation, the irritating odor cannot be completely removed, and the production cost is increased.

Experiment Examples

The initial resistance and the resistance after 1000 puffs of the heat-generating body of the electronic cigarette prepared in Examples 7 to 12 and Comparative Example 2 are tested with a bridge meter, and the results are shown in Table 1.

TABLE 1

|  | Initial resistance (ohm) | Resistance after 1000 puffs (ohm) |
|---|---|---|
| Example 7 | 1.019 | 1.108 |
| Example 8 | 1.126 | 1.204 |
| Example 9 | 1.098 | 1.136 |
| Example 10 | 1.134 | 1.184 |
| Example 11 | 1.158 | 1.209 |
| Example 12 | 1.176 | 1.220 |
| Comparative Example 2 | 1.154 | 1.216 |

It can be seen from Table 1 that the heat-generating body of the electronic cigarette of the present disclosure has low resistance, and the resistance does not significantly increase after long-term use, which proves that the heat-generating body of the electronic cigarette prepared by using the heat-generating electronic paste composition of the present disclosure has good heat-generating performance.

The technical features of the above-described embodiments may be arbitrarily combined. In order to make the description simple, not all possible combinations of the technical features in the above embodiments are described. However, as long as there is no contradiction in the combination of these technical features, the combinations should be in the scope of the present disclosure.

What described above are only several implementations of the present disclosure, and these embodiments are specific and detailed, but not intended to limit the scope of the present disclosure. It should be understood by the skilled in the art that various modifications and improvements can be made without departing from the conception of the present disclosure, and all fall within the protection scope of the present disclosure. Therefore, the patent protection scope of the present disclosure is defined by the appended claims.

What is claimed is:

1. A heat-generating electronic paste composition, comprising:
    a water-based carrier; and
    a functional phase;
    wherein the water-based carrier comprises a water-soluble binder and water; and
    wherein the functional phase comprises an electrically conductive material; and
    wherein a weight ratio of the water-based carrier to the functional phase is 1:(2-5) and/or a weight ratio of the water-soluble binder to the water is (15-30): 100.

2. The heat-generating electronic paste composition according to claim 1, wherein the electrically conductive material is selected from the group consisting of stainless steel, nickel-chromium alloy, iron-chromium-aluminum alloy, and combinations thereof.

3. The heat-generating electronic paste composition according to claim 1, wherein the water-soluble binder is selected from the group consisting of a modified starch, methylcellulose, hydroxymethylcellulose, and carboxymethylcellulose, and combinations thereof.

4. The heat-generating electronic paste composition according to claim 3, wherein the water-soluble binder comprises the modified starch and the methylcellulose, and a weight ratio of the modified starch to the methylcellulose is 1:(1-3).

5. The heat-generating electronic paste composition according to claim 4, wherein a weight-average molecular weight of the modified starch is 10,000 to 80,000; and/or a weight-average molecular weight of the methylcellulose is 20,000 to 100,000.

6. The heat-generating electronic paste composition according to claim 1, wherein the functional phase further comprises a surface modifier, and the surface modifier is selected from the group consisting of microcrystalline cellulose, hydroxymethylcellulose, carboxymethylcellulose, and combinations thereof.

7. The heat-generating electronic paste composition according to claim 6, wherein a weight ratio of the surface modifier to the electrically conductive material is (3-8): 100.

8. The heat-generating electronic paste composition according to claim 1, further comprising a functional additive, wherein the functional additive comprises at least one of a thixotropic agent and a preservative.

9. The heat-generating electronic paste composition according to claim 8, wherein based on 100 parts by weight of the water-based carrier, a content of the thixotropic agent is 0.3 to 1 part by weight; and/or
    based on 100 parts by weight of the water-based carrier, a content of the preservative is 0.2 to 0.8 parts by weight.

10. A method for preparing a heat-generating electronic paste, the method comprising:
    mixing a water-soluble binder with water, and performing a first heat treatment to obtain a water-based carrier; and
    mixing the water-based carrier with a functional phase, and performing a second heat treatment to obtain the heat-generating electronic paste;
    wherein the functional phase comprises an electrically conductive material.

11. The method according to claim 10, wherein conditions of the first heat treatment are as follows: the temperature is 80° C. to 90° C.; the time is 4 h to 6 h; and/or
    a weight ratio of the water-soluble binder to the water is (15-30):100; and/or
    the water-soluble binder is selected from the group consisting of a modified starch, methylcellulose, hydroxymethylcellulose, and carboxymethylcellulose, and combinations thereof.

12. The method of claim 10, wherein a weight ratio of the water-based carrier to the functional phase is 1:(2-5); and/or conditions of the second heat treatment are as follows: the temperature is 80° C. to 90° C.; the time is 6 h to 8 h.

13. The method of claim 10, wherein the electrically conductive material is selected from the group consisting of stainless steel, nickel-chromium alloy, iron-chromium-aluminum alloy, and combinations thereof.

14. The method according to claim 10, wherein the water-based carrier is firstly mixed with the functional phase, then mixed with a functional additive, and then subjected to the second heat treatment; the functional additive comprises at least one of a thixotropic agent and a preservative.

15. The method according to claim 10, wherein before mixing the water-based carrier with the functional phase, the electrically conductive material is mixed with the surface modifier to obtain the functional phase; the surface modifier is selected from the group consisting of microcrystalline cellulose, hydroxymethylcellulose, carboxymethylcellulose, and combinations thereof.

16. The method of claim 15, wherein a weight ratio of the surface modifier to the electrically conductive material is (3-8): 100.

17. A heat-generating electronic paste prepared by the method for preparing the heat-generating electronic paste according to claim 10.

18. A heat-generating body of an electronic cigarette, the heat-generating body comprising:
   a substrate; and
   a heat-generating circuit formed on the substrate;
   wherein the heat-generating circuit is made from the heat-generating electronic paste according to claim 17.

19. An electronic cigarette, the electronic cigarette comprising: the heat-generating body of the electronic cigarette according to claim 18.

\* \* \* \* \*